United States Patent
Giraud et al.

(10) Patent No.: US 11,733,471 B2
(45) Date of Patent: Aug. 22, 2023

(54) VARIABLE SIZE SEAL AND METHOD

(71) Applicant: CORNING RESEARCH & DEVELOPMENT CORPORATION, Corning, NY (US)

(72) Inventors: William Julius McPhil Giraud, Azle, TX (US); Brian Duane Kingsbury, Watauga, TX (US); Robert Tomasz Klak, Zdunska Wola (PL)

(73) Assignee: Corning Research & Development Corporation, Corning, NY (US)

( * ) Notice: Subject to any disclaimer, the term of this patent is extended or adjusted under 35 U.S.C. 154(b) by 338 days.

(21) Appl. No.: 17/030,865

(22) Filed: Sep. 24, 2020

(65) Prior Publication Data

US 2021/0011241 A1  Jan. 14, 2021

Related U.S. Application Data

(63) Continuation of application No. PCT/US2019/024903, filed on Mar. 29, 2019.
(Continued)

(51) Int. Cl.
*G02B 6/00* (2006.01)
*G02B 6/44* (2006.01)
*H02G 15/013* (2006.01)

(52) U.S. Cl.
CPC ......... *G02B 6/4444* (2013.01); *G02B 6/4446* (2013.01); *H02G 15/013* (2013.01)

(58) Field of Classification Search
CPC .... G02B 6/4444; G02B 6/4446; G02B 6/444; G02B 6/00; H02G 15/013
See application file for complete search history.

(56) References Cited

U.S. PATENT DOCUMENTS 5,701,634 A   12/1997  Uemura et al.
6,792,191 B1 *  9/2004  Clapp, Jr. ............ G02B 6/4452
                                                  385/135
(Continued)

FOREIGN PATENT DOCUMENTS

CN    201113317 Y    9/2008
DE    102006042368 A1    3/2008
(Continued)

OTHER PUBLICATIONS

International Search Report and Written Opinion of the International Searching Authority; PCT/US2019/024903; dated Jul. 23, 2019; 13 Pages; European Patent Office.

*Primary Examiner* — Jennifer Doan

(57) ABSTRACT

A seal may include a first seal section defining a first internal cylindrical surface defining a first internal diameter configured to provide a substantially fluid-resistant seal between the first internal cylindrical surface and an external surface of a cable. The seal may also include a second seal section coupled to the first seal section and defining a second internal cylindrical surface defining a second internal diameter configured to provide a substantially fluid-resistant seal between the second internal cylindrical surface and an external surface of a cable, wherein the first internal diameter and the second internal diameter may differ from one another. An entry module assembly for facilitating entry of one or more cables into an enclosure may include an entry module plate defining an aperture configured to receive a cable therethrough, and a seal coupled to the entry module plate and extending through the aperture of the entry module plate.

22 Claims, 6 Drawing Sheets

Related U.S. Application Data

(60) Provisional application No. 62/652,694, filed on Apr. 4, 2018.

(56) References Cited

U.S. PATENT DOCUMENTS

| | | |
|---|---|---|
| 8,009,955 B2 | 8/2011 | Smith et al. |
| 9,447,909 B2 * | 9/2016 | Smith .................... F16L 15/04 |
| 2015/0054229 A1 | 2/2015 | Haynes et al. |

FOREIGN PATENT DOCUMENTS

| | | |
|---|---|---|
| DE | 202013102386 U1 | 6/2013 |
| DE | 202013004636 U1 | 8/2014 |
| DE | 102014114568 A1 | 4/2016 |
| WO | 2005/107028 A1 | 11/2005 |
| WO | WO-2013050180 A2 * | 4/2013 ............. H01R 43/20 |

* cited by examiner

VARIABLE SIZE SEAL AND METHOD

PRIORITY APPLICATIONS

This application is a continuation of International Application No. PCT/US19/24903, filed on Mar. 29, 2019, which claims the benefit of priority to U.S. Application No. 62/652,694, filed on Apr. 4, 2018, both applications being incorporated herein by reference.

BACKGROUND

This disclosure relates to a variable size seal, and more particularly, to a variable size seal for providing a seal with cables having different sizes and related methods.

Cabinets may be used to enclose and protect equipment, such as, for example, fiber optic equipment associated with fiber optic cables including optical fibers. For example, fiber optic equipment may be enclosed in cabinets and provide connections and circuitry for facilitating broadband voice, video, and data transmission. One example of a cabinet for enclosing fiber optic equipment is a fiber optic distribution outdoor cabinet, some of which may be intended to be installed in an outdoor environment exposed to the elements. In order to protect cables and equipment inside the cabinet, some such cabinets are constructed to provide a fluid-resistant barrier between the interior of the cabinet and the surroundings. However, the construction of such cabinets may suffer from a number possible drawbacks. For example, the construction of such cabinets often renders it difficult or impossible to repair or replace some parts of the cabinet and/or the cables and equipment inside the cabinet without replacing large portions of the cabinet, or even the entire cabinet. In addition, the portion of the cabinet at the location at which cables enter the cabinet cannot be removed or replaced without disconnecting the cables from the respective connection points inside the cabinet, which may render its removal or replacement difficult and time consuming. Furthermore, it may be desirable to run cables of different sizes into the cabinet while still providing a fluid-resistant seal between the cable and the portion of the cabinet through which the cable enters the cabinet. This may necessitate the use of different size seals to accommodate the different size cables, which may result in undesirably large or costly inventories of different size seals.

Some examples described herein may address one or more of these possible drawbacks.

SUMMARY

The present disclosure is generally directed to a seal including a first seal section defining a first internal cylindrical surface defining a first internal diameter configured to provide a substantially fluid-resistant seal between the first internal cylindrical surface and an external surface of a cable. The seal may also include a second seal section coupled to the first seal section and defining a second internal cylindrical surface defining a second internal diameter configured to provide a substantially fluid-resistant seal between the second internal cylindrical surface and an external surface of a cable, wherein the first internal diameter and the second internal diameter may differ from one another.

In some examples, the first seal section may further define a first external surface defining at least one first external dimension configured to pass through an internal surface of an aperture through a plate. The second seal section may further define a second external surface defining at least one second external dimension configured to pass through the internal surface of the aperture through the plate, wherein the at least one first external dimension is greater than the at least one second external dimension.

In some examples of the seal, the seal may also include a flange section coupled to the first seal section opposite the second seal section. The flange section may define an internal flange opening and an external flange portion projecting outwardly beyond the first external surface and the second external surface. In some examples, the external flange portion may define a cross-section including a first flange seal surface and a second flange seal surface opposite the first flange seal surface, and wherein the first flange seal surface and the second flange seal surface are configured such that a first flange seal surface of a first seal and a second flange seal surface of a second seal abut one another at a seal interface and provide a substantially fluid-resistant seal between the first flange seal surface of the first seal and the second flange seal surface of the second seal.

This disclosure is also generally directed to an entry module assembly including an entry module plate defining an aperture configured to receive a cable therethrough, and a seal coupled to the entry module plate and extending through the aperture of the entry module plate. The seal may be configured, in some examples, to provide a substantially fluid-resistant seal between a cable extending through the seal and the seal, and between the seal and the aperture in the entry module plate. The seal may include a first seal section defining a first internal cylindrical surface defining a first internal diameter configured to provide a substantially fluid-resistant seal between the first internal cylindrical surface and an external surface of a cable. The seal may also include a second seal section coupled to the first seal section and defining a second internal cylindrical surface defining a second internal diameter configured to provide a substantially fluid-resistant seal between the second internal cylindrical surface and an external surface of a cable. In some examples, the first internal diameter and the second internal diameter may differ from one another.

This disclosure is also generally directed to a method for providing a fluid-resistant seal between a cable and an aperture in a plate through which the cable extends. The method may include providing a seal including a plurality of seal sections, each of the plurality of seal sections defining an internal cylindrical surface defining an internal diameter, wherein the internal diameters of at least some of the respective seal sections are different from one another. The method may also include selecting a seal section, from among the plurality of seal sections, having an internal cylindrical surface defining an internal diameter corresponding to an external diameter of an external surface of the cable. The method may also include inserting the seal into the aperture, and positioning the seal relative to the aperture, such that the seal provides a fluid resistant seal between an external surface of the seal and an internal surface of the aperture. The method may further include separating the selected seal section from at least one of the plurality of seal sections, and passing an end of the cable through the seal, such that the seal provides a fluid-resistant seal between the internal cylindrical surface of the selected seal section and the external surface of the cable. In some examples, separating the selected seal section from at least one of the plurality of seal sections occurs after inserting the seal into the aperture. In some examples, separating the selected seal section from at least one of the plurality of seal sections occurs prior to inserting the seal into the aperture.

DETAILED DESCRIPTION

Figure 1:
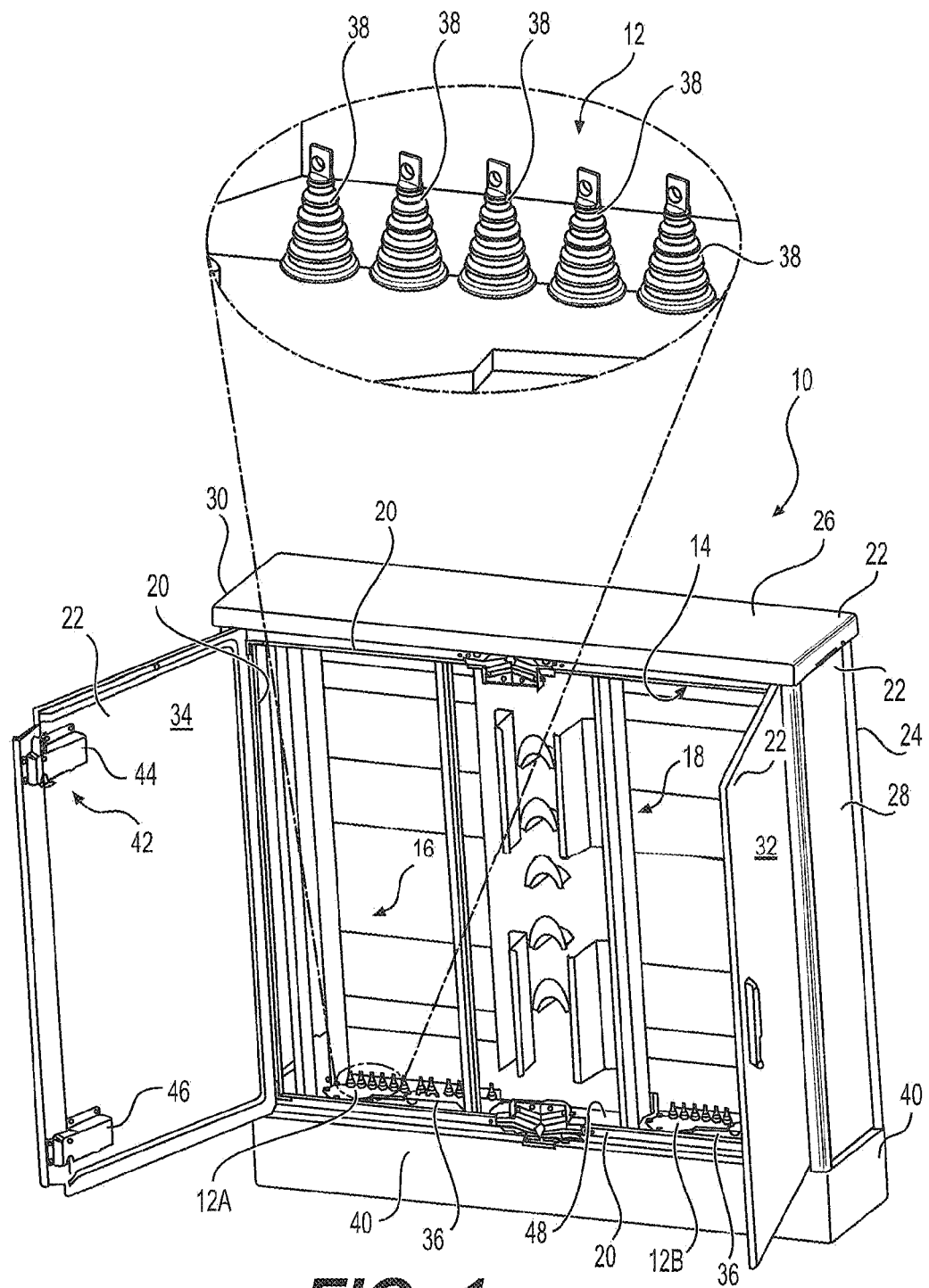
FIG. 1 is a schematic perspective view of an example enclosure including a detailed perspective view of an example entry module assembly for facilitating entry of a plurality of cables into the enclosure.

Reference will now be made in detail to embodiments, examples of which are illustrated in the accompanying drawings. Whenever possible, the same reference numbers are used throughout the drawings to refer to the same or like parts.

This disclosure is generally directed to variable size seals, and more particularly, to variable size seals for providing a seal with cables having different sizes and related methods. For example, such seals may be usable with entry module assemblies for facilitating entry of cables into an enclosure. According to some examples, the enclosures described herein may be assembled on site and may be scalable to meet the capacity requirements of the equipment being enclosed by the enclosure. For example, some examples of the enclosure may be formed by a frame assembled from frame members coupled to one another by brackets. The frame members may be provided (or modified on-site) to build a frame (e.g., off-site or on-site) defining the desired interior dimensions, and the brackets may be used to couple the frame members to one another. Thereafter, panels may be attached to the frame to create the enclosure. In some examples, one or more of the panels may be pivotally coupled to the frame to provide one or more doors configured to pivot between open and closed orientations. The enclosure may include an entry module assembly configured to facilitate entry of cables from exterior the enclosure to the interior of the enclosure. In some examples, the entry module assembly may be configured to be at least a part of the floor of the enclosure, and in some examples, the entry module assembly may be part of another portion of the enclosure, such as, for example, at least a part of the back side of the enclosure, at least a part of a side of the enclosure, at least of part of the top of the enclosure, or at least a part of the front side of the enclosure. In some examples, the equipment to be enclosed in the enclosure may be assembled and/or coupled to the interior of the enclosure during and/or after completion of assembly of the enclosure.

In some examples, the entry module assembly may be configured such that at least a portion of the entry module assembly may be repaired or replaced without disconnecting the cables from cable connection points in the interior of the enclosure. For example, access to the entry module assembly may be gained by repositioning or removal of one or more panels of the enclosure. In some examples, access to the entry module assembly may be gained by opening one of more of the door panels. In some examples, access to the entry module assembly may be gained by removing one or more back panels of the enclosure. Once access to the entry module assembly has been gained, one or more portions of the entry module assembly may be repositioned, repaired, and/or removed. For example, the entry module assembly may include two of more selectively separable module plates that form one or more apertures through which one or more cables enter the enclosure. In some examples, because the module plate being removed includes a portion of an aperture that does not completely surround one or more of the cables, the module plate may be removed without necessarily disconnecting the one or more cables from their respective connection points. In some examples, two or more plates define one or more of the apertures through which the one or more cables pass, and thus, either or both of such module plates may be removed without disconnecting the one or more cables from the respective connection points of the cables in the interior of the enclosure. This example configuration may render repair and/or replacement of one or more portions of the entry module assembly less complex and less time consuming.

In addition, the seals, according to some examples, may be configured to provide a fluid-resistant seal (e.g., a fluid-tight seal) between a cable and one or more module plates of the entry module assembly. In some examples, the seals may be configured to provide such a seal for a number of cables having different sizes (e.g., cables having different size outer diameters). As explained herein, some examples of the seals may have a plurality of seal sections, each defining an interior surface defining different diameters to accommodate cables of different sizes. Some such seals may be configured such that seal sections that do not have an interior diameter corresponding to an exterior diameter of the cable may be separated from the seal section having an interior diameter corresponding to (e.g., having the same size or a smaller size to provide a sealing fit) the exterior diameter of the cable. Such example seals may provide flexibility when selecting seals for use with different size cables, which may, for example, reduce inefficiencies associated with acquiring and/or storing different size seals for each cable size.

FIG. 1 is a schematic perspective view of an example enclosure 10 including a detailed perspective view of an example entry module assembly 12. The example enclosure 10 shown in FIG. 1 is a cabinet for enclosing fiber optic equipment, such as fiber optic cables including optical fibers, and connections and circuitry for facilitating broadband voice, video, and data transmission. In some examples, the enclosure 10 may be a fiber optic distribution outdoor cabinet, which may be intended to be installed in an outdoor environment exposed to the elements. Other types of enclosures for enclosing other types of equipment are contemplated.

As shown in FIG. 1, the example enclosure 10 defines an interior 14 and an exterior 16. In the example shown, the interior 14 includes various structures 18 known to those skilled in the art for facilitating routing and/or connection of fiber optic cables including optical fibers. The example enclosure 10 shown includes a frame 20 and a plurality of exterior panels 22 secured to the frame 20 for enclosing the interior 14 of the enclosure 10. For example, the enclosure 10 includes a back panel 24 coupled to a back side of the frame 20, a top panel 26 coupled to a top side of the frame 20, a first side panel 28 coupled to a first side of the frame 20, a second side panel 30 coupled to a second side of the frame 20 opposite the first side panel 28, a first door panel 32 coupled to a front side of the frame 20 such that it pivots with respect to the frame 20, and a second door panel 34 coupled to a front side of the frame 20 such that it pivots with respect to the frame 20. In some examples, the enclosure 10 also includes a bottom panel 36 coupled to a bottom side of the frame 20.

In some examples, the bottom panel 36 may include an opening configured to receive therein the entry module assembly 12. In some examples, the entry module assembly 12 may form the majority (or entirety) of the bottom panel 36. As explained herein, the entry module assembly 12 facilitates entry of cables, such as, for example, fiber optic cables, into the interior 14 of the enclosure 12. In some examples, one or more seals 38 may be provided to provide a substantially fluid-resistant seal (e.g., a fluid-tight seal) between each of the one or more cables and the entry module assembly 12, for example, as explained in more detail herein.

The example enclosure 10 shown in FIG. 1 also includes a skirt 40 coupled to and extending around the periphery of the bottom of the frame 20, which provides protection for cables entering the interior 14 of the enclosure 10 through the bottom panel 36. One or more of the first door panel 32 or the second door panel 34 may include a latch assembly 42 for securing the first and second door panels 32 and 34 in the closed orientation. In the example shown, the latch assembly 42 includes an upper latch mechanism 44 and a lower latch mechanism 46, each including a keeper configured to selectively engage a respective upper member of the frame 20 and lower member of the frame 20. Although FIG. 1 shows the latch assembly 42 coupled to an interior side of the second door panel 34, in some examples, a second latch mechanism may be coupled to the interior side of the first door panel 32.

Figure 2:
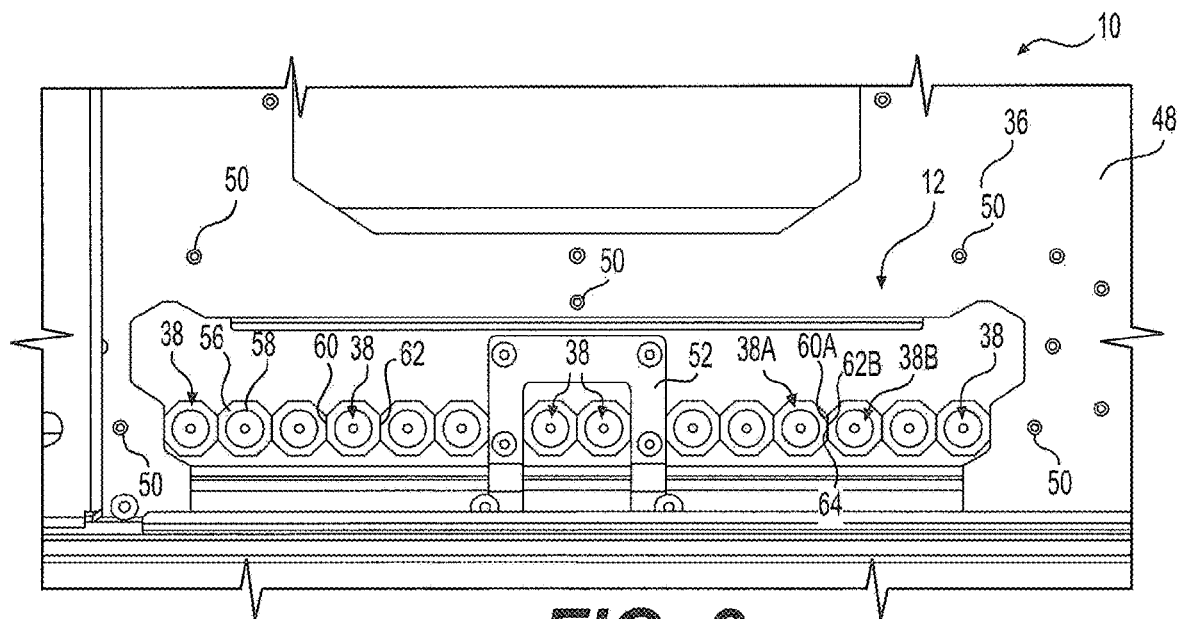
FIG. 2 is a partial schematic plan view of the example enclosure shown in FIG. 1 showing an example entry module assembly from below.

FIG. 2 is a partial schematic plan view of the example enclosure 10 shown in FIG. 1 showing an example entry module assembly 12 from below. In the example shown, the bottom panel 36 forms a majority of the floor 48 of the enclosure 10. In some examples, the bottom panel 36 may be a single piece unitary construction, and in other examples, the bottom panel 36 may be formed from two or more panels coupled to one another to form the majority of the floor 48. The example shown in FIG. 1 includes two entry module assemblies 12A and 12B. Some examples may only include a single entry module assembly 12, and other examples may include more than two entry modules assemblies 12. In the example shown, each of the entry module assemblies 12A and 12B is removably coupled to the bottom panel 36 by fasteners 50, such as, for example, screws and/or nuts and bolts. Other ways of removably coupling the entry module assemblies 12A and 12B to the bottom panel 36 are contemplated. In some examples, a seal or gasket may be provided between the perimeter of one or more of the entry module assemblies 12A or 12B and the bottom panel 36 to provide a substantially fluid-resistant seal (e.g., a fluid-tight seal) between one or more of the entry module assemblies 12A or 12B and the bottom panel 36.

As shown in FIG. 2, the example entry module assembly 12 is coupled to the portion of the enclosure 10 by an example attachment bracket 52, which is coupled to both the entry module assembly 12 and the interior 14 of the enclosure 10. In some examples, a plurality of the seals 38 may be provided to provide a fluid-resistant seal (e.g., a fluid-tight seal) between each cable that enters the enclosure 10 and the entry module assembly 12, for example, as explained in more detail herein. In some examples, the seals 38 may include one or more of natural rubber, synthetic rubber, and plastics, and/or any other suitable elastic materials for providing a fluid-resistant seal. The example shown in FIG. 2 includes fourteen seals 38 for receiving fourteen cables. Fewer or more seals 38 and cables are contemplated.

Figure 3:
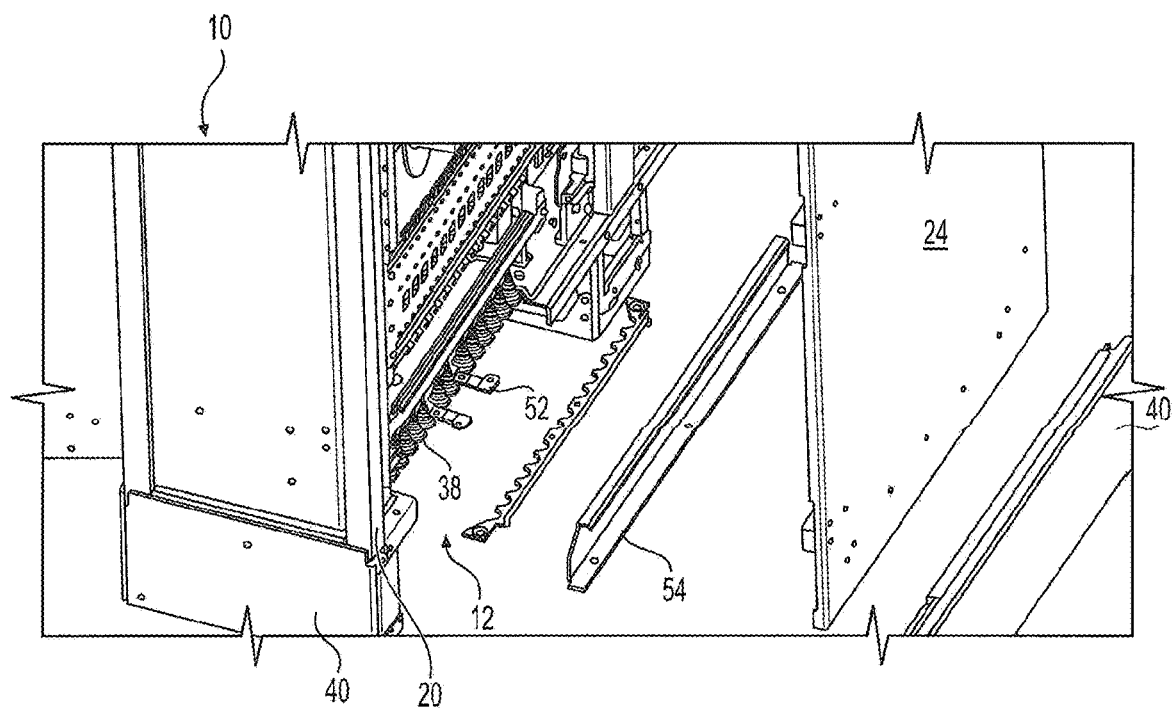
FIG. 3 is schematic perspective exploded view of the example enclosure shown in FIG. 1.

FIG. 3 is a schematic perspective exploded view of the example enclosure 10 shown in FIG. 1, with the back panel 24 and a portion of the skirt 40 removed, for example, to show access to the example entry module assembly 12. As shown in FIG. 3, the back panel 24 may be removed, for example, by separating it from a back side of the frame 20. For example, the back panel 24 may be removably coupled to the frame 20 by one or more fasteners, and the one or more fasteners may be removed to facilitate removal of the back panel 24 from the back side of the frame 20. In some examples, a back side of the skirt 40 and/or a lower back side frame member 54 may also be removed, for example, to provide access to the entry module assembly 12. In some examples, the attachment bracket 52 may be removably coupled to the lower back side frame member 54, for example, via one or more fasteners.

Figure 4:
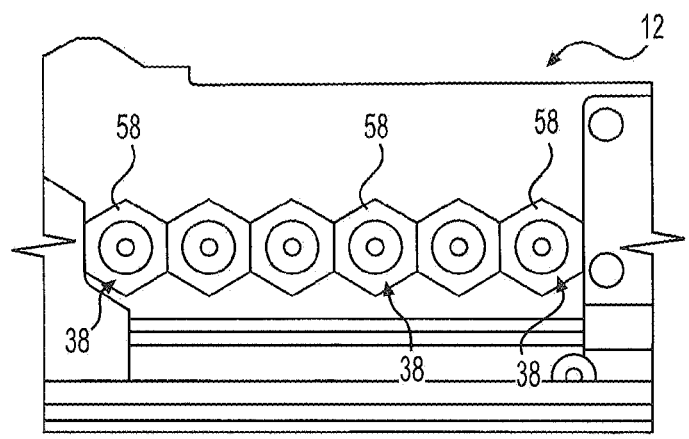
FIG. 4 is a partial schematic plan view of an example enclosure showing another example entry module assembly from below.
Figure 5:
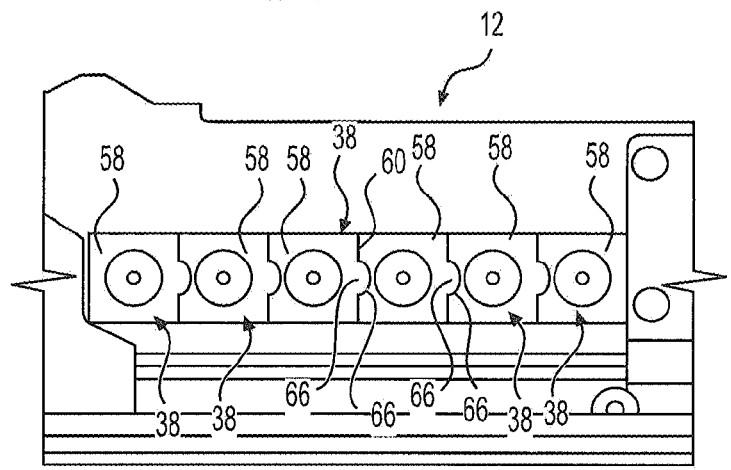
FIG. 5 is a partial schematic plan view of an example enclosure showing another example entry module assembly from below.
Figure 6:
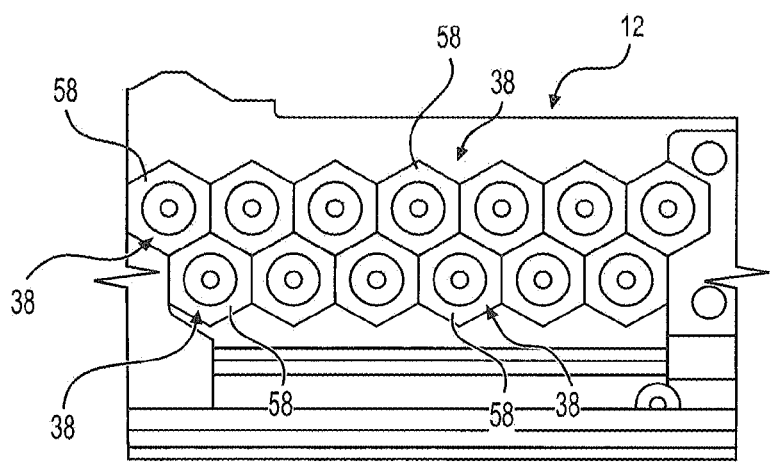
FIG. 6 is a partial schematic plan view of an example enclosure showing another example entry module assembly from below.

FIGS. 4-6 are similar to FIG. 3 and show partial schematic plan views of example enclosures showing several example entry module assemblies 12 from below. For example, FIG. 2 shows example seals 38 having example flange sections 56, each including an external flange portion 58 defining a cross-section including a first flange seal surface 60 and a second flange seal surface 62 opposite the first flange seal surface 60. In some examples, the first flange seal surface 60 and the second flange seal surface 62 are configured such that a first flange seal surface 60A of a first seal 38A and a second flange seal surface 62B of a second seal 38B abut one another at a seal interface 64 providing a substantially fluid-resistant seal (e.g., a fluid-tight seal) between the first flange seal surface 60A of the first seal 38A and the second flange seal surface 62B of the second seal 38B, as explained in more detail herein.

In the example shown in FIG. 2, each of the external flange portions 58 of the seals 38 is octagonal. In the example shown in FIG. 4, each of the external flange portions 58 of the seals 38 is hexagonal. In the example shown in FIG. 5, each of the external flange portions 58 of the seals 38 is square. As shown in FIG. 5, in some examples, regardless of the cross-sectional shape of the external flange portion 58, the external flange portions 58 may have a flange seal surface 60 defining a profile 66 configured to engage a complimentary profile 66 on an adjacent seal 38. The profile 66 may define a number of different complimentary shapes, such as, for example, a square wave, a sinusoidal wave, a saw tooth wave, etc. In the example shown in FIG. 6, each of the external flange portions 58 of the seals 38 is hexagonal, and the example entry module assembly 12 includes more than a single row of seals 38, for example, with the rows abutting one another to provide a fluid-resistant seal (e.g., a fluid-tight seal) between external flange portions 58 of the different rows. In some examples, the rows may be separated from one another. In some examples, the seals 38 of a given row may include external flange portions 58 having different cross-sectional shapes. In some such examples, adjacent seals 38 may include first and second flange seal surfaces 60 and 62 that provide fluid-resistant seals (e.g., fluid-tight seals) between adjacent seals 38. For example, an external flange portion 58 of a first seal 38 may be square-shaped, and one or more of the adjacent seals 38 may have external flange portions 58 that are hexagonal-shaped or octagonal-shaped.

Figure 7:
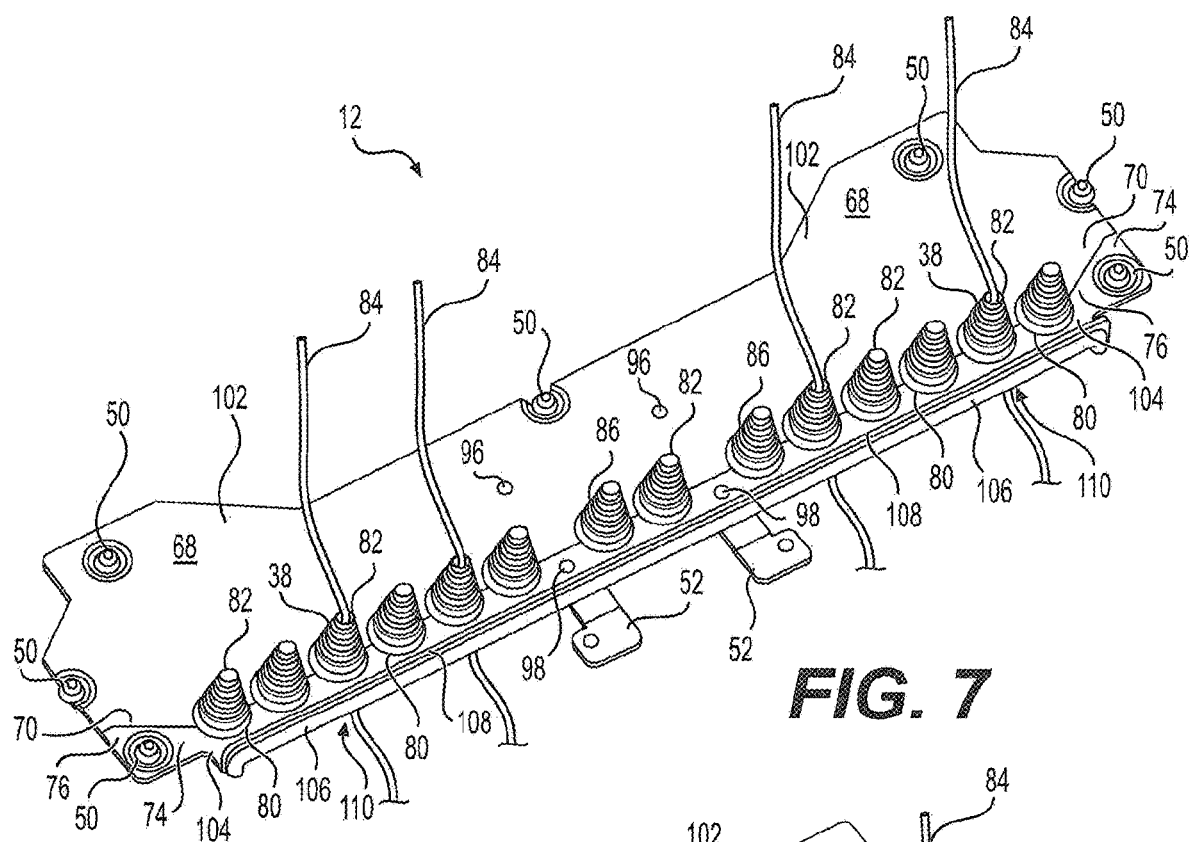
FIG. 7 is a schematic perspective view of an example entry module assembly.
Figure 8:
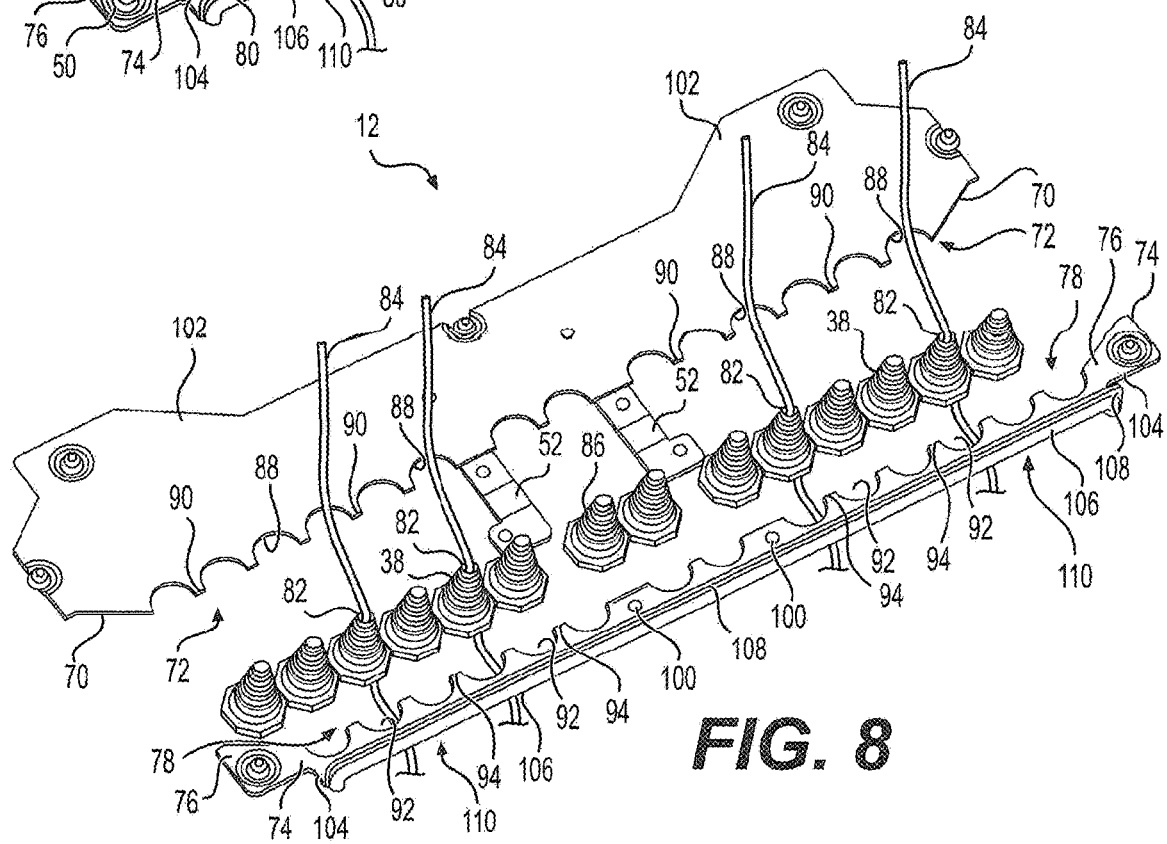
FIG. 8 is a schematic exploded perspective view of the example entry module assembly shown in FIG. 7.

FIGS. 7 and 8 are a schematic perspective view of an example entry module assembly 12 and an exploded perspective view of the example entry module assembly 12 shown in FIG. 7, respectively. In the example shown in FIGS. 7 and 8, the entry module assembly 12 includes a first module plate 68 including a first edge 70 defining a first edge profile 72. The example entry module assembly 12 also includes a second module plate 74 including a second edge 76 defining a second edge profile 78. In some examples, such as the example shown, the first module plate 68 and the second module plate 74 are configured to abut one another (see FIG. 7), such that the first edge profile 72 and the second edge profile 78 define one or more apertures 80 therebetween (see FIG. 8). For example, the first module plate 68 and the second module plate 74 are configured to abut one another, such that the first edge profile 72 and the second edge profile 78 define a plurality of apertures 80 therebetween. Features described herein as being associated with the first module plate 68 may instead be associated with the second module plate 74, and features described herein as being associated with the second module plate 74 may instead be associated with the first module plate 68.

In the examples shown in FIGS. 7 and 8, a plurality of the seals 38 may be coupled to the entry module assembly 12, and each of the seals 38 may define an interior passage 82 through which a respective cable 84 may pass. As explained above, the seals 38 may be configured to provide a fluid-resistant seal (e.g., a fluid-tight seal) between an outer surface of a respective cable 84 and an interior surface defined by the interior passage 82 of a respective seal 38, and a fluid-resistant-seal (e.g., a fluid-tight seal) between an exterior surface 86 of the respective seal 38 and an interior surface of the respective aperture 72 of the entry module assembly 12. For example, a respective cable 84 may pass through an interior passage 82 from exterior 16 relative to the enclosure 12 to the interior 14 of the enclosure 12. In some examples, the seals 38 may be coupled to the first and second module plates 68 and 74 by coupling the first and second module plates 68 and 74 to one another, such that the respective seals 38 are received in a respective aperture 80. For example, the exterior surface 86 of the seal 38 may be configured to secure the seal 38 to an edge of a respective aperture 80, for example, such that a fluid-resistant seal (e.g., a fluid-tight seal) is provided.

In the example shown in FIGS. 7 and 8, the first edge profile 72 defines first aperture portions 88 and first edge segments 90 between at least some of the first aperture portions 88. The example second edge profile 78 defines second aperture portions 92 and second edge segments 94 between at least some of the second aperture portions 92. In some examples, the first module plate 68 and the second module plate 74 are configured to abut one another, such that at least some of the first edge segments 90 abut at least some of the second edge segments 94, and at least some of the first aperture portions 88 and at least some of the second aperture portions 92 define the plurality of apertures 80. In the example shown, the example apertures 80 defined by the first and second aperture portions 88 and 92 are substantially circular. In some examples, one or more of the apertures 80 may have a shape other than substantially circular. For example, one or more of the apertures 80 may be polygonal in shape (e.g., square-shaped, pentagonal-shaped, hexagonal-shaped, octagonal-shaped, etc.). In the example shown in FIGS. 7 and 8, each of the first and second aperture portions 88 and 92 are substantially identical. In some examples, the first and second aperture portions 88 and 92 may be different. In some examples, either the first aperture portions 88 or the second aperture portions 92 may be substantially a continuation of the respective first edge segments 90 or the second edge segments 94, for example, such that the first edge profile 72 or the second edge profile 78 is substantially straight.

In the example shown in FIGS. 7 and 8, the first edge segments 90 and the second edge segments 94 are substantially straight segments. In some examples, the first and second edge segments 90 and 94 may define complimentary but non-straight segments, such as, for example, interfitting square waves, interfitting sinusoidal waves, interfitting saw tooth profiles, etc. Such examples may serve to register the first module plate 68 with the second module plate 74, for example, such that the first and second aperture portions 88 and 92 are aligned with one another. In some examples, one or more of the first edge segments 90 and one or more of the second edge segments 94 may define edge segments having different shapes.

In the example shown in FIGS. 7 and 8, the first module plate 68 lies substantially in a first plane, and the second module plate 74 lies substantially in a second plane. Although lying in respective planes, one or more of the first module plate 68 or the second module plate 74 may also include non-planar aspects. In some examples, the first module plate 68 and the second module plate 74 are configured to abut one another, such that the first plane and the second plane are substantially coplanar and/or substantially parallel with respect to one another.

In some examples, the attachment bracket 52 may be coupled (e.g., removably) to one or more of the first module plate 68 or the second module plate 74. In some examples, the attachment bracket 52 may be configured to removably couple the entry module assembly 12 to the enclosure 10. For example, the attachment bracket 52 may be configured to removably couple the entry module assembly 12 to the interior 14 of the enclosure 12, for example, to the frame 20 (e.g., to the lower back side frame member 54) and/or to the bottom panel 36. In the example shown in FIGS. 7 and 8, the attachment bracket 52 is removably coupled to the first module plate 68 (e.g., via one or more fasteners 96) (FIG. 8), and is removably coupled to the second module plate 74 (e.g., via one or more fasteners 98). For example, the example second module plate 74 shown in FIGS. 7 and 8 includes holes 100 configured to receive the example fasteners 98. In the example shown, the attachment bracket 52 serves to removably couple the first and second module plates 68 and 74 to one another. In some examples, the attachment bracket 52 may include a single part or two or more parts.

As shown in FIGS. 7 and 8, in some examples, the first module plate 68 defines a first remote edge 102 opposite the first edge 70, and the second module plate 74 defines a second remote edge 104 opposite the second edge 76. The entry module assembly 12 may also include at least one edge seal 106 coupled to one or more of the first remote edge 102 or the second remote edge 104. For example, as shown in FIGS. 7 and 8, the second remote edge 104 defines an edge flange 108, and the edge seal 106 is coupled to an outboard side 110 of the edge flange 108. The edge seal 106, in some examples, may provide a fluid-resistant seal (e.g., a fluid-tight seal) between the entry module assembly 12 (e.g., the second module plate 74) and the interior 14 of the enclosure 12. In some examples, the edge seal 106 may be adhesively secured to the edge flange 108. (Even though the example second module plate 74 includes the example edge flange 108, the second module plate 74 lies substantially in a plane.)

Figure 9:
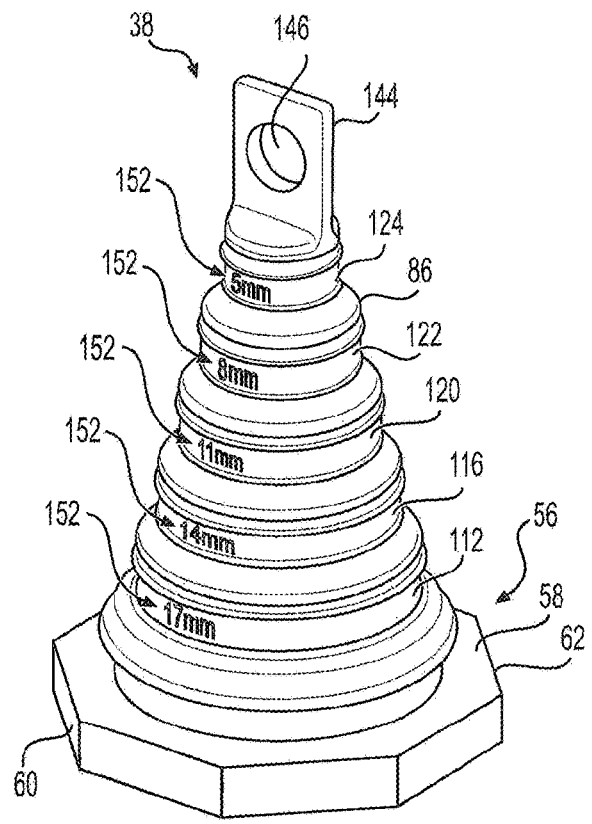
FIG. 9 is a schematic perspective view of an example seal for use in an example entry module assembly.
Figure 10:
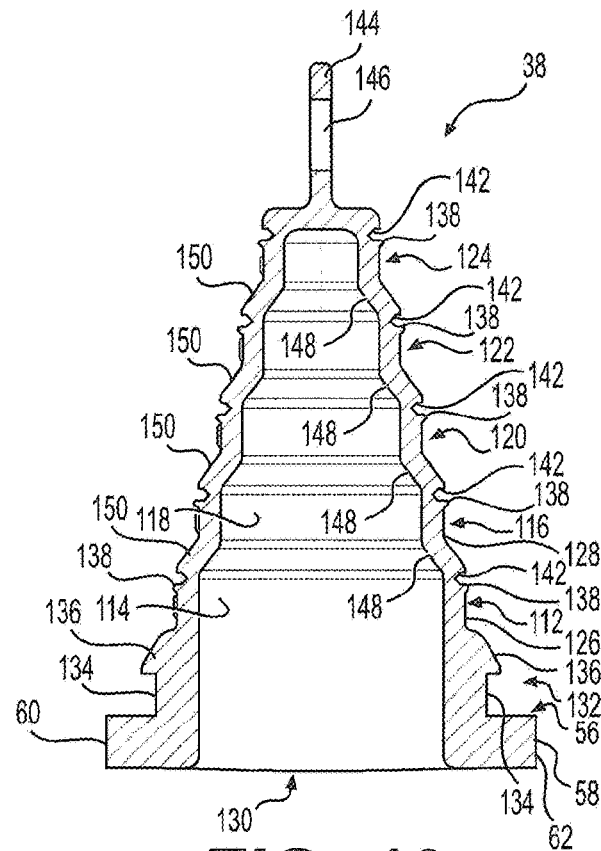
FIG. 10 is a schematic side section view of the example seal shown in FIG. 9.

FIGS. 9-13 show an example seal 38. FIG. 9 is a schematic perspective view of an example seal 38 for use in an example entry module assembly 12, and FIG. 10 is a schematic side section view of the example seal 38 shown in FIG. 9. The example seal 38 shown in FIGS. 9 and 10 includes a first seal section 112 defining a first internal cylindrical surface 114 defining a first internal diameter configured to provide a substantially fluid-resistant seal between the first internal cylindrical surface 114 and an external surface of a cable 84 (see, e.g., FIG. 11). The example seal 38 also includes a second seal section 116 coupled to the first seal section 112 and defining a second internal cylindrical surface 118 defining a second internal diameter configured to provide a substantially fluid-resistant seal between the second internal cylindrical surface 118 and an external surface of a cable 84, for example, having a relatively smaller exterior diameter than the cable 84 received by the first internal cylindrical surface 114. The example shown in FIGS. 9 and 10 also includes a third seal section 120, a fourth seal section 122, and a fifth seal section 124, with each of the third, fourth, and fifth seal sections 120, 122, and 124 having respective internal cylindrical surfaces defining respective internal diameters, for example, similar to the first and second seal sections 112 and 116, except with the respective internal diameters successively being relatively reduced to accommodate and provide a fluid-resistant seal (e.g., a fluid-tight seal) with respective cables having successively smaller corresponding exterior diameters.

Figure 11:
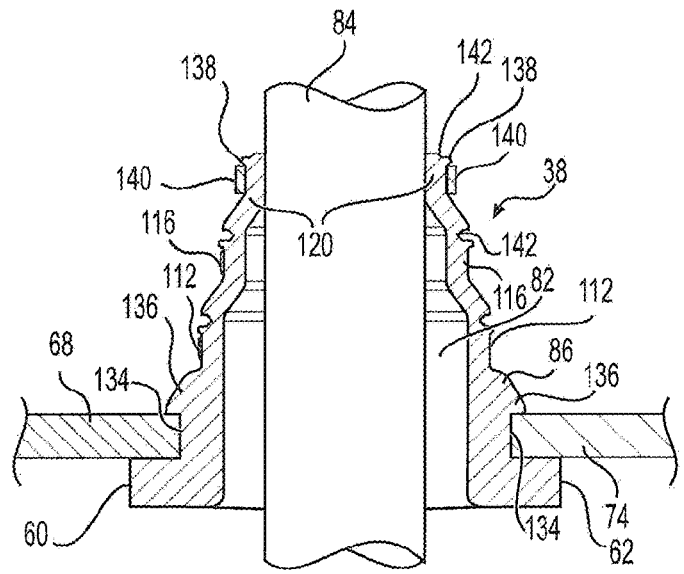
FIG. 11 is a schematic side section view of the example seal shown in FIGS. 9 and 10 in which seal sections have been separated and removed from an example selected seal section to accommodate an example cable.

In the example shown, the first seal section 112 further defines a first external surface 126 defining at least one first external dimension configured to pass through an aperture in a plate, such as, for example, the aperture 80 defined by the first and second module plates 68 and 74 of the entry module assembly 12, for example, as shown in FIG. 11. In some examples, the second seal section 116 further defines a second external surface 128 defining at least one second external dimension configured to pass through an aperture in a plate, such as, for example, the aperture 80 defined by the first and second module plates 68 and 74 of the entry module assembly 12. For example, in the example shown in FIGS. 9-11, the at least one first external dimension of the first external surface 126 is greater than the at least one second external dimension of the second external surface 128. In some examples, the third, fourth, and/or fifth seal sections 120, 122, and/or 124 define respective third, fourth, and/or fifth external surfaces defining at least one first external dimension configured to pass through an aperture in a plate, such as, for example, the aperture 80 defined by the first and second module plates 68 and 74 of the entry module assembly 12.

The example seal 38 shown in FIGS. 9-11 also includes a flange section 56 coupled to the first seal section 112 opposite the second seal section 116. As explained with respect to FIGS. 2 and 4-6, the example flange section 56 defines an internal flange opening 130 (FIG. 10) and an external flange portion 58 projecting outwardly beyond the first and second external surfaces 126 and 128 of the first and second seal sections 112 and 116, respectively. The external flange portion 58, in some examples, defines a cross-section including a first flange seal surface 60 and a second flange seal surface 62 opposite the first flange seal surface 60, and wherein the first flange seal surface 60 and the second flange seal surface 62 are configured such that a first flange seal surface 60A of a first seal 38A and a second flange seal surface 62B of a second seal 38B (see FIGS. 2 and 4-6) abut one another at a seal interface 64, providing a substantially fluid-resistant seal between the first flange seal surface 60A of the first seal 38A and the second flange seal surface 62B of the second seal 38B. In some examples, the first and second flange seal surfaces 60 and 62 serve to provide a fluid resistant seal (e.g., a fluid-tight seal) between the flange sections 56 of adjacent seals 38, which in, turn provides a fluid-resistant seal (e.g., a fluid-tight seal) along the first and second edges 70 and 76 of the respective first module plate 68 and the second module plate 74. For example, as shown in FIGS. 7 and 8 the first and second edges 70 and 76 of the first and second module plates 68 and 74 provide a seam between the first and second module plates 68 and 74, with the seals 38 positioned in the apertures 80. In some examples, the flange sections 56 of the seals 38 collectively provide a fluid resistant seal for the seam. As shown in FIGS. 2, 4-6, and 9, in some examples, the cross-section defined by the external flange portion 58 defines an external shape defining a parallelogram, and the seal interface 64 includes a first side of a parallelogram associated with the first flange seal surface 60 and a second side of a parallelogram associated with the second flange seal surface 62 (see, e.g., FIGS. 4-6).

In some examples, such as the example shown in FIGS. 9-13, the seal 38 also includes a flange transition section 132 coupling the first seal section 112 and the flange section 56 to one another, with the flange transition section 132 defining a flange groove 134 defining an outer groove surface configured to provide a substantially fluid-resistant seal (e.g., a fluid-tight seal) between the outer groove surface of the flange groove 134 and an internal surface of an aperture through a plate, such as, for example, an aperture 80 through the first module plate 68 and the second module plate 74. In some examples, the outer groove surface of the flange groove 134 defines an external cylindrical groove surface defining an external groove surface diameter configured to provide a substantially fluid-resistant seal (e.g., a fluid-tight seal) between the external cylindrical groove surface and an internal diameter of the aperture through the plate, for example, an aperture 80 through the first module plate 68 and the second module plate 74.

In some examples, for example, as shown in FIGS. 9-13, the flange transition section 132 may define a transition lip 136 between the flange groove 134 and the first seal section 112. In some examples, the seal 38 also includes a retainer lip 138 between the first external surface 126 and the second external surface 128 and projecting outwardly beyond the first external surface 128. The retainer lip 138 is configured to prevent a cable tie from sliding longitudinally off the external surface of the associated seal section. For example, as shown in FIG. 11, after a cable 84 has been inserted through a seal 38, a cable tie 140 may be tightened and secured to the external portion associated with the seal section having an internal diameter corresponding to the external diameter of the cable 84. The cable tie 140 may be tightened around the external surface to improve the seal and/or security of the cable 84 through the seal 38. The retainer lip 138 may assist with holding the cable tie 140 in the correct location on the external surface. In FIG. 11, the cable tie 140 has been tightened around the external surface associated with the third seal section 120. In some examples, retainer lips 138 may be provided between the external surfaces of the second seal section 116 and the third seal section 120, between the external surfaces of the third seal section 120 and the fourth seal section 122, and/or between the external surfaces of the fourth seal section 122 and the fifth seal section 124, for example, as shown in FIG. 10. In some examples, the external surfaces define outer cylindrical surfaces, and the transition lip 136 and/or the one or more of the retainer lips 138 are annular.

As shown in FIGS. 10 and 11, some examples of the seal 38 may include a separation groove 142 between the retainer lip 138 and the second external surface 128. The separation groove 142 may be configured to facilitate separating the second seal section 116 from the first seal section 112 at the separation groove 142. In some examples, separation grooves 142 may be provided between each of the seal sections to facilitate separating one or more of the seal sections from the seal section having an internal diameter corresponding to the external diameter of a cable 84 being passed through the seal 38. In some examples, this may also serve to open the interior passage 82 of the seal 38, so that a cable 84 may be passed through the seal 38.

As shown in FIGS. 9 and 10, some examples of the seal 38 may include a tab 144 coupled to the seal section remote from the flange section 56 (e.g., the fifth seal section 124 in FIGS. 9 and 10). The tab 144 may provide a surface for pulling a seal 38 through an aperture in a plate, for example, an aperture 80 in the first and second module plates 68 and 74. In some examples, the tab 144 may also serve as a fluid barrier at an end of the seal 38 prior to being removed when a cable 84 is passed through the seal 38. This may permit one or more of the seals 38 to be incorporated into the entry module assembly 12, even though one or more of the seals 38 does not receive a cable for entering the enclosure 10. Such unused seals 38 will still help provide the fluid-resistant seal at the entry module assembly 12 and can be used at a later time if additional cables are inserted into the enclosure 12. The tab 144 and one or more of the seal sections may be removed from one or more of the seals as needed, so that each of the additional cables can be passed through a seal, so that the seal can provide a fluid-resistant seal with the cable. In some examples, the tab 144 may define an opening 146 configured to receive, for example, a hook for pulling the seal 38 longitudinally partially through an aperture in a plate receiving the seal, for example, for pulling a seal 38 into an aperture 80 in the first and second module plates 68 and 74, such that the edges of the aperture 80 are received in the flange groove 134 (see FIG. 11).

Some examples of the seal 38 may include an internal transition section 148 between the first internal cylindrical surface 114 and the second internal cylindrical surface 118, for example, forming a partial conical surface. In some examples, additional internal transition sections 148 may be provided between one or more of the other seal sections. In some examples, the seal 38 may also include an external transition section 150 between the first external surface 126 and the second external surface 128, for example, between the retainer lip 138 and the second external surface 128. In some examples, the external transition section 150 forms a partial conical surface. Additional external transition sections may be provided between one or more of the other seal sections.

Figure 12:
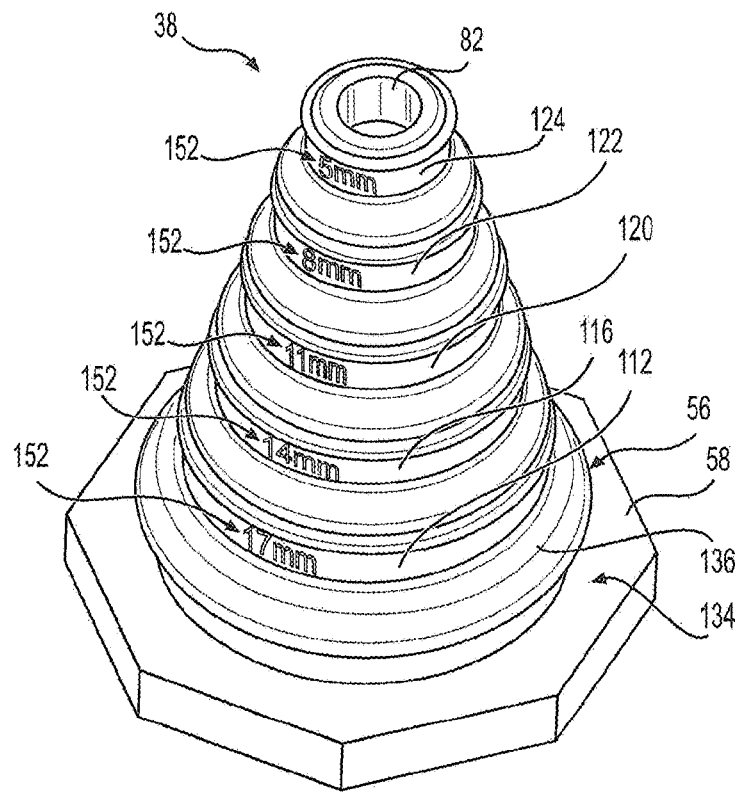
FIG. 12 is a schematic perspective view of the example seal shown in FIGS. 9 and 10 in which example an example tab been separated and removed from an example selected seal section.
Figure 13:
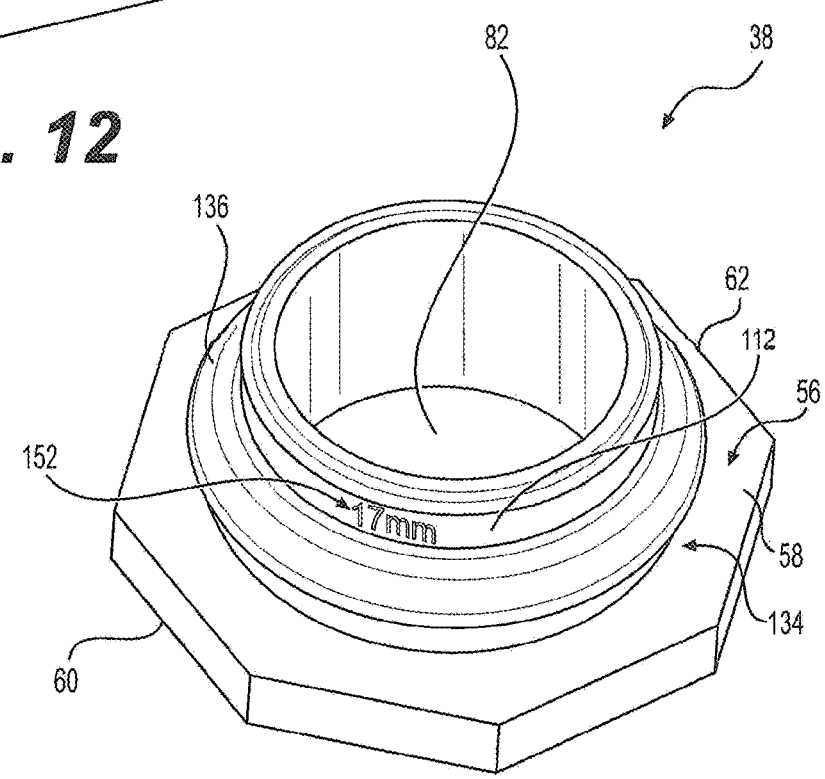
FIG. 13 is a schematic perspective view of the example seal shown in FIGS. 9 and 10 in which example seal sections have been separated and removed from an example selected seal section.

Referring to FIGS. 9 and 12, some examples may include indicia 152 on the external surfaces of one or more of the seal sections. The indicia 152 may include an indication for one or more of the seal sections of the external cable diameter that corresponds to the seal section. This may facilitate the selection of the appropriate seal section for a cable having a known external diameter. For example, the example seal 38 shown in FIGS. 9 and 12 has indicia indicating "17 mm," "14 mm," "11 mm," "8 mm," and "5 mm," for the first through fifth seal sections 112, 116, 120, 122, and 124, respectively, which provides an indication of the exterior diameter of the cable 84 corresponding to the internal diameter associated with the internal cylindrical surface diameter for each of the seal sections. Thus, in one example method, the external diameter of the cable may be determined, the appropriate seal section may be determined based at least in part on the determined external diameter of the cable and the corresponding indicia, and the seal sections having smaller internal cylindrical surface diameters may be separated from the remainder of the seal, such that the appropriate (selected) seal section(s) remain(s). In some examples, this may also open the interior passage 82 for receipt of the cable 84 therethrough. For example, FIG. 12 shows an example seal 38 from which an example tab 144 has been separated and removed from an example selected seal section. Similarly, FIG. 13 shows an example seal 38 from which the second through fifth seal sections (116, 120, 122, and 124) have been removed, leaving the first seal section 112, which has indicia 152 indicating an internal cylindrical surface diameter of "17 mm." Thereafter, the cable 84 may be passed through the seal 38 via the interior passage 82 and into the enclosure 10.

An example process for providing a fluid-resistant seal between a cable and an aperture in a plate through which the cable extends is now described. The process may include providing a seal including a plurality of seal sections. Each of the plurality of seal sections may define an internal cylindrical surface defining an internal diameter. The internal diameters of at least some of the respective seal sections are different from one another. The process may also include selecting a seal section, from among the plurality of seal sections, having an internal cylindrical surface defining an internal diameter corresponding to an external diameter of the external surface of the cable. The process may also include inserting the seal into the aperture, and positioning the seal relative to the aperture, such that the seal provides a fluid resistant seal between an external surface of the seal and an internal surface of the aperture. The process may also include separating the selected seal section from at least one of the plurality of seal sections, and passing an end of the cable through the seal, such that the seal provides a fluid-resistant seal between the internal cylindrical surface of the selected seal section and the external surface of the cable.

In some examples of the process, the seal may include a tab at one end of the seal, and positioning the seal relative to the aperture may include engaging the tab and pulling the seal into the aperture. In some examples of the process, the seal may include a flange transition section between a flange section coupled to one end of the seal and the selected seal section. The flange section may define an external flange portion projecting outwardly, and the flange transition section may define a flange groove. In some such examples, positioning the seal relative to the aperture may include positioning the seal such that the flange groove receives an edge of the aperture.

In some examples of the process, separating the selected seal section from at least one of the plurality of seal sections occurs after inserting the seal into the aperture. In other examples, separating the selected seal section from at least one of the plurality of seal sections occurs prior to inserting the seal into the aperture.

In some examples, the seal is a first seal, the aperture is a first aperture, and the cable is a first cable. The first seal may include a first flange section coupled to one end of the first seal. The first flange section may include a first external flange portion defining a first cross-section including a first flange seal surface. In some such examples, the process may further include inserting a second seal into a second aperture in the plate adjacent the first aperture. The second seal may include a second flange section coupled to one end of the second seal, and the second flange section may include a second external flange portion defining a second cross-section including a second flange seal surface. The process may also include positioning the second seal in the second aperture, such that the first flange seal surface of the first seal and the second flange seal surface of the second seal abut one another at a seal interface providing a substantially fluid-resistant seal between the first flange seal surface of the first seal and the second flange seal surface of the second seal.

Although this subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A seal comprising:
    a first seal section defining a first internal cylindrical surface defining a first internal diameter configured to provide a substantially fluid-resistant seal between the first internal cylindrical surface and an external surface of a cable; and
    a second seal section coupled to the first seal section and defining a second internal cylindrical surface defining a second internal diameter configured to provide a substantially fluid-resistant seal between the second internal cylindrical surface and an external surface of a cable,
    wherein the first internal diameter and the second internal diameter differ from one another.

2. The seal of claim 1, wherein:
    the first seal section further defines a first external surface defining at least one first external dimension configured to pass through an internal surface of an aperture through a plate; and
    the second seal section further defines a second external surface defining at least one second external dimension configured to pass through the internal surface of the aperture through the plate,
    wherein the at least one first external dimension is greater than the at least one second external dimension.

3. The seal of claim 1, further comprising a flange section coupled to the first seal section opposite the second seal section, the flange section defining an internal flange opening and an external flange portion projecting outwardly.

4. The seal of claim 3, wherein the external flange portion defines a cross-section comprising a first flange seal surface and a second flange seal surface opposite the first flange seal surface, and wherein the first flange seal surface and the second flange seal surface are configured such that a first flange seal surface of a first seal and a second flange seal surface of a second seal abut one another at a seal interface providing a substantially fluid-resistant seal between the first flange seal surface of the first seal and the second flange seal surface of the second seal.

5. The seal of claim 4, wherein the cross-section defines an external shape defining a parallelogram, and the seal interface comprises a first side of a parallelogram associated with the first flange seal surface and a second side of a parallelogram associated with the second flange seal surface.

6. The seal of claim 3, further comprising a flange transition section coupling the first seal section and the flange section to one another, the flange transition section defining a flange groove defining an outer groove surface configured to provide a substantially fluid-resistant seal between the outer groove surface of the flange groove and an internal surface of an aperture through a plate.

7. The seal of claim 6, wherein the outer groove surface defines an external cylindrical groove surface defining an external groove surface diameter configured to provide a substantially fluid-resistant seal between the external cylindrical groove surface and an internal diameter of the aperture through the plate.

8. The seal of claim 6, wherein the flange transition section defines a transition lip between the flange groove and the first seal section.

9. The seal of claim 2, further comprising a retainer lip between the first external surface and the second external surface and projecting outwardly beyond the first external surface.

10. The seal of claim 9, wherein the retainer lip is annular.

11. The seal of claim 9, further comprising a separation groove between the retainer lip and the second external surface, the separation groove configured to facilitate separating the second seal section from the first seal section at the separation groove.

12. The seal of claim 1, further comprising a tab coupled to the second seal section and providing a fluid barrier at an end of the second internal cylindrical surface opposite the first internal cylindrical surface.

13. The seal of claim 12, wherein the tab comprises an opening configured to receive a hook for pulling the seal longitudinally partially through an aperture in a plate receiving the seal.

14. The seal of claim 1, further comprising an internal transition section between the first internal cylindrical surface and the second internal cylindrical surface.

15. The seal of claim 2, further comprising an external transition section between the first external surface and the second external surface.

16. An entry module assembly comprising:
    an entry module plate defining an aperture configured to receive a cable therethrough; and
    a seal coupled to the entry module plate and extending through the aperture of the entry module plate, the seal configured to provide a substantially fluid-resistant seal between a cable extending through the seal and the seal, and between the seal and the aperture in the entry module plate, the seal comprising:
        a first seal section defining a first internal cylindrical surface defining a first internal diameter configured to provide a substantially fluid-resistant seal between the first internal cylindrical surface and an external surface of a cable; and a second seal section coupled to the first seal section and defining a second internal cylindrical surface defining a second internal diameter configured to provide a substantially fluid-resistant seal between the second internal cylindrical surface and an external surface of a cable, wherein the first internal diameter and the second internal diameter differ from one another.

17. The entry module assembly of claim 16, wherein:
the first seal section further defines a first external surface defining at least one first external dimension; and
the second seal section further defines a second external surface defining at least one second external dimension,
wherein the at least one first external dimension is greater than the at least one second external dimension.

18. The entry module assembly of claim 16, further comprising a flange section coupled to the first seal section opposite the second seal section, the flange section defining an internal flange opening and an external flange portion projecting outwardly.

19. The entry module assembly of claim 18, wherein the external flange portion defines a cross-section comprising a first flange seal surface and a second flange seal surface opposite the first flange seal surface, and wherein the first flange seal surface and the second flange seal surface are configured such that a first flange seal surface of a first seal and a second flange seal surface of a second seal abut one another at a seal interface providing a substantially fluid-resistant seal between the first flange seal surface of the first seal and the second flange seal surface of the second seal.

20. The entry module assembly of claim 19, wherein the cross-section defines an external shape defining a parallelogram, and the seal interface comprises a first side of a parallelogram associated with the first flange seal surface and a second side of a parallelogram associated with the second flange seal surface.

21. A seal comprising:
a first seal section defining a first internal cylindrical surface defining a first internal diameter configured to provide a substantially fluid-resistant seal between the first internal cylindrical surface and an external surface of a cable; and
a second seal section coupled to the first seal section and defining a second internal cylindrical surface defining a second internal diameter configured to provide a substantially fluid-resistant seal between the second internal cylindrical surface and an external surface of a cable,
wherein the first internal diameter and the second internal diameter differ from one another;

a flange section coupled to the first seal section opposite the second seal section, the flange section defining an internal flange opening and an external flange portion projecting outwardly;
wherein the external flange portion defines a cross-section comprising a first flange seal surface and a second flange seal surface opposite the first flange seal surface, and wherein the first flange seal surface and the second flange seal surface are configured such that a first flange seal surface of a first seal and a second flange seal surface of a second seal abut one another at a seal interface providing a substantially fluid-resistant seal between the first flange seal surface of the first seal and the second flange seal surface of the second seal.

22. An entry module assembly comprising:
an entry module plate defining an aperture configured to receive a cable therethrough; and
a seal coupled to the entry module plate and extending through the aperture of the entry module plate, the seal configured to provide a substantially fluid-resistant seal between a cable extending through the seal and the seal, and between the seal and the aperture in the entry module plate, the seal comprising:
a first seal section defining a first internal cylindrical surface defining a first internal diameter configured to provide a substantially fluid-resistant seal between the first internal cylindrical surface and an external surface of a cable; and
a second seal section coupled to the first seal section and defining a second internal cylindrical surface defining a second internal diameter configured to provide a substantially fluid-resistant seal between the second internal cylindrical surface and an external surface of a cable,
wherein the first internal diameter and the second internal diameter differ from one another;
a flange section coupled to the first seal section opposite the second seal section, the flange section defining an internal flange opening and an external flange portion projecting outwardly;
wherein the external flange portion defines a cross-section comprising a first flange seal surface and a second flange seal surface opposite the first flange seal surface, and wherein the first flange seal surface and the second flange seal surface are configured such that a first flange seal surface of a first seal and a second flange seal surface of a second seal abut one another at a seal interface providing a substantially fluid-resistant seal between the first flange seal surface of the first seal and the second flange seal surface of the second seal.

* * * * *